United States Patent
Treadaway

[11] 3,888,454
[45] June 10, 1975

[54] MEANS FOR FORMING A SEAL ABOUT A CONDUIT

[75] Inventor: Frank G. Treadaway, Mineral Wells, Tex.

[73] Assignee: Harsco Corporation, Harrisburg, Pa.

[22] Filed: Jan. 3, 1973

[21] Appl. No.: 320,760

[52] U.S. Cl............................ 249/90; 425/DIG. 60
[51] Int. Cl...... B22d 19/04; B29c 27/00; C09j 5/10
[58] Field of Search............ 249/83, 90, 91, 94, 96, 249/97, 89, 98; 425/405 R, DIG. 60, 108, 127; 285/9 R, 189, 197, 284; 264/263, 261, 248, 249; 164/61, 112, 333, 253

[56] References Cited
UNITED STATES PATENTS

| | | | |
|---|---|---|---|
| 2,259,281 | 10/1941 | Williams et al. | 249/83 X |
| 2,441,097 | 5/1948 | Hicks | 425/DIG. 60 X |
| 3,754,846 | 8/1973 | Choate | 425/DIG. 60 X |

Primary Examiner—Francis S. Husar
Assistant Examiner—John S. Brown
Attorney, Agent, or Firm—Cameron, Kerkam, Sutton, Stowell & Stowell

[57] ABSTRACT

A method and means for forming a resilient plastic seal about a conduit extending through the wall of a housing or vessel and to anchor the conduit to said wall comprising, a mold having a passage with an open cavity on one face thereof and a passage therethrough through which the conduit may be extended. The open cavity of the mold is retained in position against the surface of the wall through which the conduit extends by means of an annular groove on the inner side thereof to which a suction is applied to hold same to the wall by vacuum. An opening is provided in the mold through which plastic material such as polyurethane may be injected in liquid form and allowed to set and harden about the conduit to provide a resilient bonded seal between the wall and the conduit to resiliently secure the conduit to the wall.

3 Claims, 13 Drawing Figures

PATENTED JUN 10 1975 3,888,454
SHEET 1
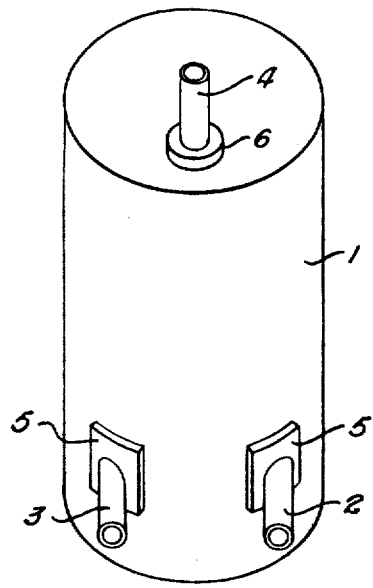
Fig. I
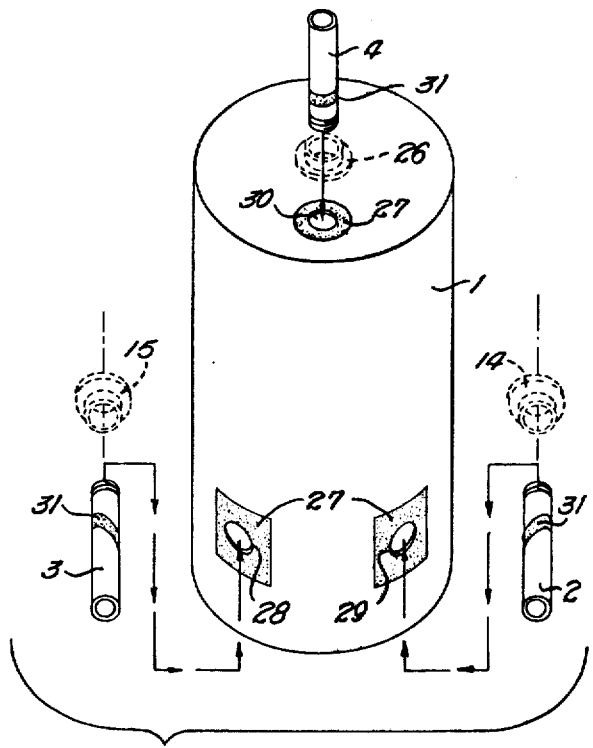
Fig. II
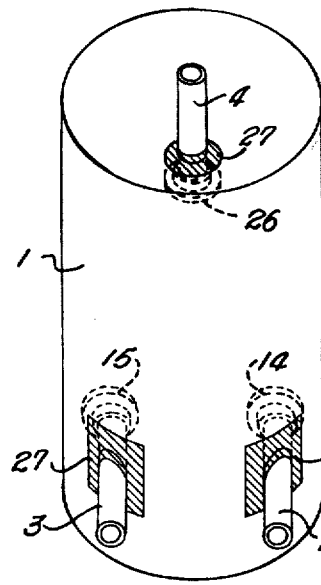
Fig. III
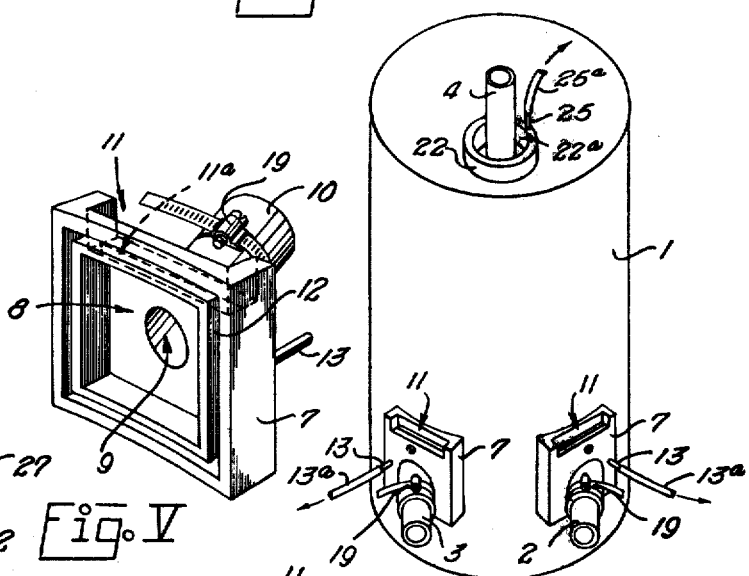
Fig. IV
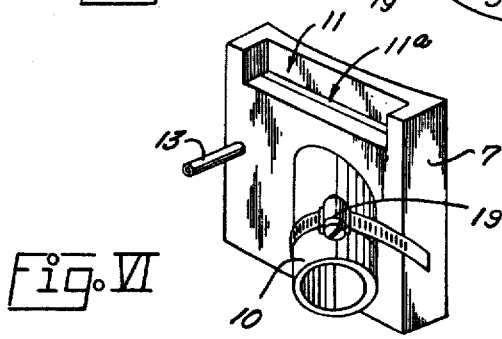
Fig. V
Fig. VI

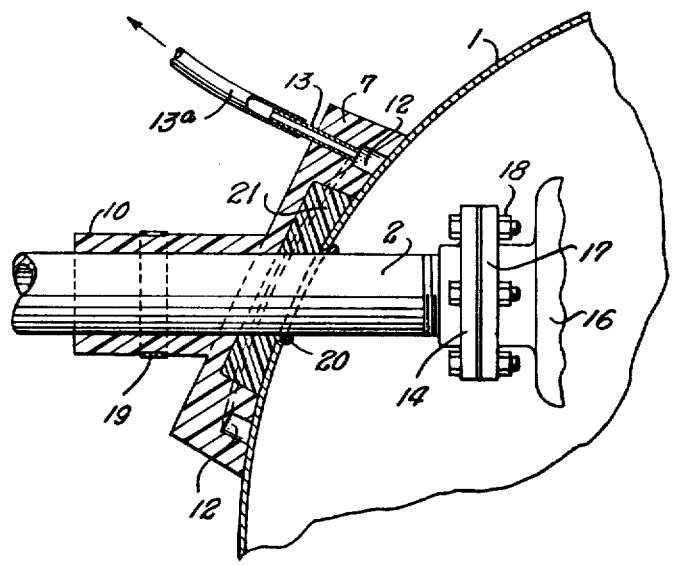
Fig. VIII
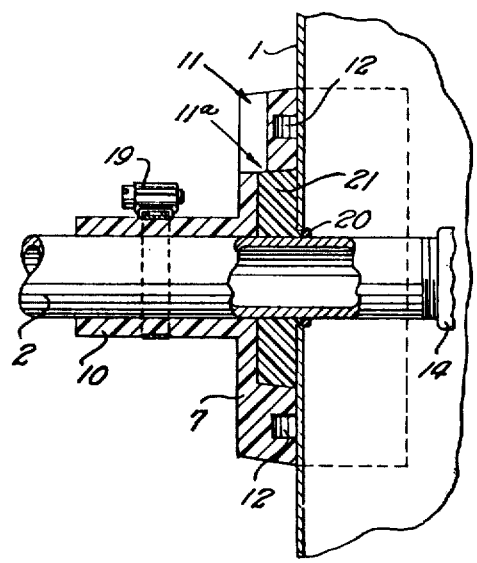
Fig. IX
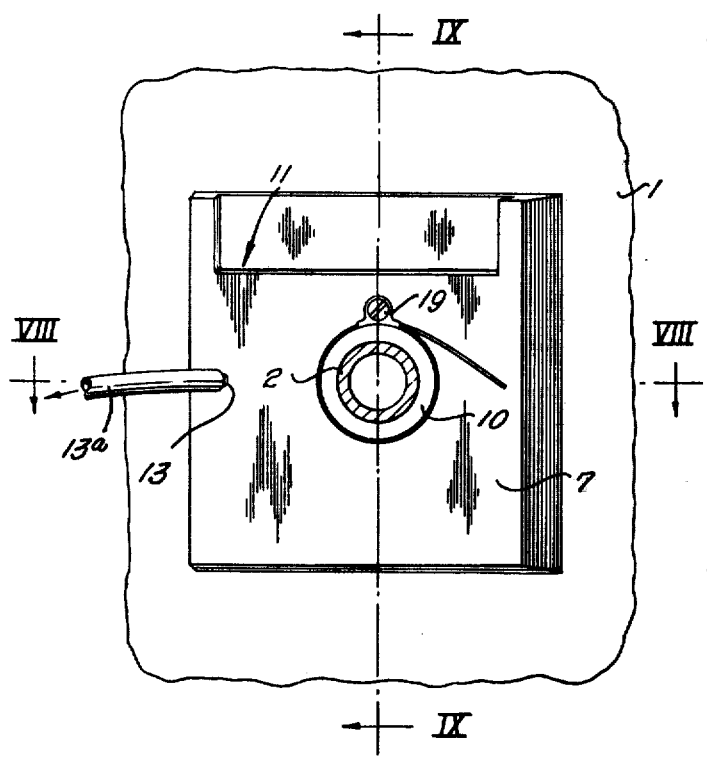
Fig. VII
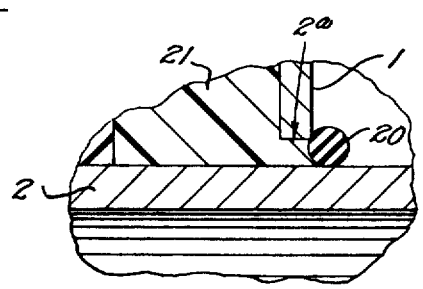
Fig. X

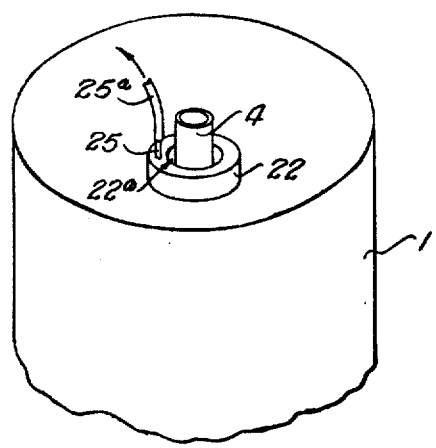
Fig. XI
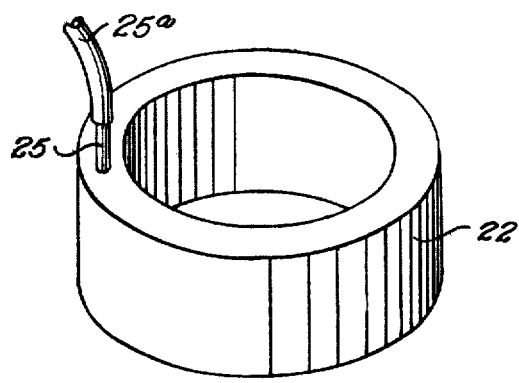
Fig. XII
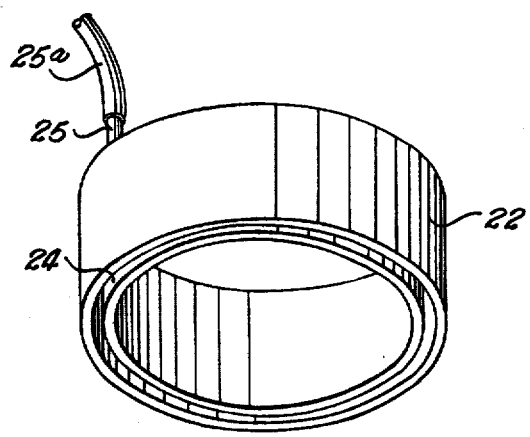
Fig. XIII

MEANS FOR FORMING A SEAL ABOUT A CONDUIT

BACKGROUND OF THE INVENTION

It has been the practice in many industrial applications to extend conduits through walls and housings wherein it is necessary or desirable that a seal be provided about the conduit where it passes through the wall, which usually entails the placing of a separate seal member or grommet about the conduit adjacent the passage and the wall through which it extends, or the application of sealing material manually or otherwise between the passage and the conduit. In either event such procedure required an excessive amount of labor and material, and at the same time did not provide an effective seal.

Such was a particular problem in sealing about conduits extending through the wall of pump stations or ejector shells used in sewage disposal equipment. The present procedure involves the use of grout sleeves welded to the outer surface of the wall about the passage through which the conduit extends, and the packing of grout into the sleeve about the conduit to form a seal thereabout. This involves several time consuming and expensive steps, which consist of the formation of a grout tube either by rolling same from a plate or cutting a section from a pipe, and the formation of a weld bead around the inside perimeter of the sleeve to aid in retaining the grout to the sleeve. A hole was cut in the shell and the grout sleeve was positioned and welded into place thereabout. After the conduit is extended through the sleeve and attached to the piping on the interior of the pump station, retaining members, such as boards, were positioned about the pipe against the grout sleeve inside the station which were temporarily held in place with tapes. The grouting compound was then poured or tamped into the sleeves and a plastic material was placed over the outer surface thereof to provide an external seal within the grouting sleeve. After drying the boards were removed.

This not only provided an unstable seal which could be broken by flexure or lateral or longitudinal movement of the conduit but provided an unsightly and inefficient seal which was unduly expensive to install.

BRIEF DESCRIPTION OF THE INVENTION

The present invention contemplates a method and apparatus for installing a permanent flexible plastic seal which is bonded to the surface of the wall through which the conduit extends and to the conduit about the passage through which the conduit extends in an efficient and relatively inexpensive procedure which provides a secure and efficient seal about the conduit, which is strong, yet flexible, so that flexure or limited lateral or longitudinal of the conduit with reference to the wall through which it extends does not break or damage the seal.

In forming the seal a mold is provided which may be detachably secured to the wall about the passage therethrough by means of a vacuum. The conduit is extended through the mold cavity and through the passage in the wall to which it is attached and is temporarily sealed thereabout and the outer face of the mold so that when liquid plastic material such as polyurethane is injected into the mold about the conduit and allowed to set thereagainst, and against the wall about the passage therethrough, and is allowed to cure and set, the mold may be quickly and easily removed by releasing the suction applied thereto and the temporary seal about the conduit. When the mold is removed from about the conduit, the cured seal material remains bonded about the conduit and to the outer surface of the wall about the passage through which the conduit extends.

It is therefore the primary object of the invention to provide a method of forming a flexible seal between a conduit and a wall through which it extends which effectively seals about the conduit.

A still further object of the invention is to provide a flexible plastic seal about a conduit and a wall through which it extends which will withstand flexure and limited longitudinal or lateral movement of the conduit with reference to the wall without breaking or damaging the seal.

Another object of the invention is to provide means for detachably positioning a mold to a surface to which plastic sealing material is to be applied by means of a vacuum which may be released from such surface by discontinuing the suction applied thereto.

Still another object of the invention is to provide a method of applying a flexible plastic seal about a conduit extending through the wall of a housing or the like comprising disengageable attachment of a mold about the conduit and against the wall, the injection of plastic material into the mold, allowing the plastic material to set and bond to the outer surface of the conduit and the wall, and the removal of the mold.

A general object of the invention is to provide a method and means for attaching a flexible plastic seal between a conduit and a wall through which the conduit extends which is relatively inexpensive and time-saving to apply, yet provides an efficient and permanent seal and anchor which is not subject to deterioration or damage by limited lateral or longitudinal flexure between the conduit and the wall.

Other and further objects of the invention will become apparent upon reading the detailed specification hereinafter following and by referring to the drawings annexed hereto.

DESCRIPTION OF THE DRAWINGS

Suitable embodiments are shown in the attached drawings wherein:

FIG. I is a perspective view of a typical sewage ejector station, with suction and discharge conduits extending through the wall thereof about which the elastic seal, constituting the subject matter of this invention, has been formed;

FIG. II is an exploded view of the ejector shell and conduits illustrating the preparation of the surfaces about the conduits and the surfaces about the passages through the wall of the shell to which the plastic sealing material is to be applied in carrying out the process hereinafter described;

FIG. III is a perspective view showing the conduits after they have been inserted through the respective passages formed through the ejector shell;

FIG. IV is a perspective view of the ejector shell after the molds hereinafter described have been placed about the conduits and against the walls of the shell about the passages therethrough preparatory to injecting the plastic material into the mold;

FIG. V is a rear perspective view of one form of the mold.

FIG. VI is a front perspective view of the mold;

FIG. VII is a front elevational view of the preferred form of mold after having been positioned against the surface of the wall through which a conduit extends;

FIG. VIII is a cross-sectional elevational view of the mold with a conduit extending therethrough after the plastic sealing material has been injected into the cavity of the mold;

FIG. IX is a cross-sectional elevational view taken along the line IX—IX of FIG. VII showing the plastic material after being injected into the mold;

FIG. X is an enlarged sectional view showing the temporary sealing gasket positioned about the conduit temporarily closing the annular space between the passages through the wall and the conduit.

FIG. XI is a perspective view of a modified form of mold made in circular form as it is shown positioned against a wall and about a conduit to which sealing material is to be applied;

FIG. XII is an enlarged perspective view of the mold shown in FIG. XI;

FIG. XIII is a bottom perspective view of the mold shown in FIG. XII showing the vacuum groove formed about the lower surface thereof;

DESCRIPTION OF A PREFERRED EMBODIMENT

Numeral references are employed to designate the various parts shown in the drawings and like numerals indicate like parts throughout the various figures of the drawings.

A preferred embodiment of method and apparatus for forming the seal about the conduit extending through a wall is shown in FIGS. I-X.

The numeral 1 indicates a pump or ejector station used in sewage disposal operations which consists of a steel tank in which is mounted a pump and control equipment, (not shown) with which suction pipes 2 and 3 and a discharge pipe 4 communicate through the wall of a pump station.

Plastic seals 5 formed in the manner hereinafter described are disposed about the conduits 2 and 3 and are bonded to the wall of the pump station 1 and about the conduits to provide a seal between the passages 28 and 29 through said wall and said conduits. A plastic seal 6, formed by the modified form of mold shown in FIGS. XI-XIII, is bonded about the discharge conduit 4 and to the upper wall of the pump station.

The preferred form of mold 7 is rectangular in shape, and has a cavity 8 formed on the inner surface thereof. A circular passage 9 extends through the wall of the mold and communicates with the cavity 8, and there is integrally formed about the passage 9 on the outer surface of the mold a hollow collar 10 through which may be extended a conduit such as conduits 2 and 3 (See FIG. VIII). The outer face of the mold 7 is cut away as indicated at 11, and an elongated opening 11a is provided through the wall of the mold body communicating with the cavity 8, through which plastic material may be injected in liquid form to fill the cavity and allowed to cure and set therein to form the seal 5.

A suction groove 12 is formed on the inner face of the mold body 7 about the cavity 8, and a suction passage 13 extends through the wall of the mold and communicates with the groove 12.

A flexible suction line 13a may be attached to the suction passage 13 to which suction may be applied from a suction pump (not shown) to the groove 12.

The suction lines 2 and 3 and discharge line 4 have flanged collars 14 and 26 threadedly engaged thereto so that they may be secured to the inlet and outlet of a pump 16 by attaching same to flanged openings 17 thereon by means of bolts 18.

The conduit 2 or 3 may be extended through the collar 10 and passage 9 and through the opening 28 or 29 in the wall of the housing 1. The collar 10 is sealed about the conduit 2 or 3 by means of a clamp 19. The mold body 7 may be made of flexible material such as rubber or plastic, so that the collar 10 may be deformed and sealingly pressed against the surface of the conduit 2 or 3 to provide a seal thereabout.

The inner surface of the mold 7 is positioned about the outer surface of the wall of the housing 1 and suction is applied through the suction passage 13 to the groove 12, to provide a vacuum between the groove and the outer surfaces of the housing 7 to cause the housing 7 to adhere to the surface of the wall in predetermined fixed position while the plastic material is being injected into the mold cavity.

A particular advantage of the suction attachment of the mold to the wall is that such mold may be employed to implace plastic material about a conduit which extends laterally or vertically from wall, eliminating the requirement of temporary attachment means therefor, such as tape or adhesive.

Prior to attachment of the conduit 2 or 3 to the flange 17, an elastic ring gasket is stretched thereabout and positioned about the conduit adjacent the annular space 2a (FIG. X) provided between the passage 28 or 29 and the conduit extending therethrough. Ring gasket 20 prevents the plastic material 21 from flowing through said annular space when injected into the mold.

The plastic material for forming the seals 5 and 6 is preferably polyurethane resin mixed with suitable catalyst to set same, the particular product employed being that which is manufactured by Chemical Products Corporation and is a mixture of 87.2 parts of R8810 (Black Part A) and 12.8 parts of PKR 5727 (clear Catalytic part B) which may be mixed, employing a mixing pump or by hand, prior to injection into the mold. The polyurethane resin material is non-porous but slightly flexible when cured.

DESCRIPTION OF A MODIFIED FORM

A modified form of mold 22 is shown in FIGS. XI-XIII. The mold 22 may be lifted upwardly for removal from the seal after it is cured and from about the conduit 4 which extends therethrough.

A vacuum groove 24 is formed about the lower side of the mold body 22, and a vacuum fitting 25 communicates therewith through the body 22 so that a flexible suction hose 25a may be attached to the fitting 25 and suction applied to the groove 24 to cause the mold to adhere to the surface of a wall to which it is attached by vacuum.

Conduit 4 has an attachment flange 26 threadedly secured thereto for attachment of same to a conduit or a fitting within the housing 1 after the conduit 4 has been extended through the passage 30 provided through the upper wall of the housing 1.

Preparatory to attaching the seal about a conduit extending into the housing 1, the housing is formed, and the required holes such as 28, 29 and 30 are formed therethrough. The surfaces of the shell is shot blasted preparatory to painting. The area on the exterior of the housing 1, surrounding the holes where the seal is to be applied, is covered with masking tape and the housing is painted and forwarded to the assembly department. Prior to securing the end plates to the housing the suction and discharge pipes 2 and 3 are shot blasted in the area in which the bond with the plastic material will occur. The pipes are inserted through the holes in the wall of the housing, either from exteriorly or interiorly thereof depending upon whether they have flanges 14 and 15 thereon. If flanged, the flanges are bolted into place to the inlet and outlet passages of the pump 16. After such operation is completed, the tape covering the areas about the passage to which the seal is to be bonded is removed.

A suitable primer is applied to the surface areas 27, about the passages 28, 29 and 30 on the housing and the areas 31 on the pipes 2, 3 and 4 to which the polyurethane seal material is to be applied. A suitable primer is that which is manufactured by Chemical Products Corporation identified as X-9935.

After the primer is dry the molds 7 and 22 are placed in position as shown in FIGS. VIII and IX. Suction is applied to the suction fittings 13 or 26 which evacuates grooves 12 or 24, causing the mold 7 or 22 to adhere to the surface of the wall against which it is positioned. The polyurethane seal material as hereinbefore described is placed into the mold cavity 8 in liquid form through the passage 11a or in the annular space 22a sufficient to fill the mold cavity 8 or annular space 22a. The plastic material is then allowed to cure and set, after which the suction is released from fittings 13 or 25 to allow the mold to be removed from the seal 5 or 6, which is now integrally joined and bonded to the conduit, to the wall of the housing and to the side of the passage in the wall through which the conduit extends.

To remove mold 7 from conduit 3 the clamp 19 is released and slipped off over the end of the conduit 2 or 3. To remove the mold 22 from about the conduit 4, or other conduit about which it is attached, it is lifted upwardly and passed about the conduit. Mold 22 is made of flexible material such as rubber or plastic so that it can be stretched for removal from the conduit about which it is attached.

It should be appreciated that molds 7 and 22 may be secured to surfaces to tank 1 by connector means such as tape if it is deemed expedient to do so. For example, mold 22 may comprise an elongated band having opposite ends taped together to form a circular mold. The circular mold positioned about pipe 4 may be taped about the outer periphery to form a seal between the band and the surface of the tank. After resin, poured between the band and the pipe, has cured, the tape can be removed leaving the band as a permanent support about the seal.

It will thus be seen that I have provided a method and means for forming a flexible seal and anchor between a conduit and the wall of a housing through which the conduit passes in a relatively inexpensive manner and at the same time provides an effective seal and anchor which is durable and less likely to be broken or displaced by flexure or movement of the conduit.

Having described my invention, I claim:

1. A mold to form a seal about a conduit extending through a wall comprising; a hollow flexible cylindrical mold body having a central passage extending therethrough; upper and lower end surfaces on said hollow cylindrical mold body, said lower end surface having an annular groove formed therein adjacent the periphery thereof, said annular groove extending about said central passage; and means to evacuate air from said annular groove to secure said lower end surface on said cylindrical body to the wall about the conduit when the conduit is positioned to extend through said passage.

2. A mold to form a seal about a conduit extending through an opening in a wall, said mold comprising: a flexible mold body having a cavity formed therein; inner and outer surfaces on said mold body, said inner surface having a groove formed therein adjacent the periphery of the mold body, said cavity extending through a central portion of said inner surface; a collar secured to said outer surface of said mold body, said collar having a passage extending therethrough communicating with said cavity to receive the conduit, said mold body having an opening formed therein communicating with said cavity; and means to evacuate air from said groove to secure said inner surface of the mold body to the wall about the conduit.

3. The combination called for in claim 2 with the addition of clamp means on said collar adapted to urge surfaces on said collar into sealing engagement with a conduit extending through said passage.

* * * * *